UNITED STATES PATENT OFFICE 2,404,503

PREPARATION OF AMINO ACIDS FROM THEIR SALTS

Morris S. Kharasch and Charles F. Fuchs, Chicago, Ill., assignors to Eli Lilly and Company, Indianapolis, Ind., a corporation of Indiana No Drawing. Application April 1, 1944, Serial No. 529,225

7 Claims. (Cl. 260—534)

This invention relates to the preparation of amino acids from their acid-addition salts with mineral acids, particularly from their hydrohalide salts.

The methods described in the literature to obtain amino acids from their hydrohalides are not entirely satisfactory. Those methods either require expensive materials or do not yield pure products, or both.

One of the most frequently used methods to liberate amino acids from their hydrohalides consists in treating an aqueous solution of the amino-acid hydrohalide with an excess of silver oxide or lead oxide, separating the resulting solid from the solution, and then removing the resultant insoluble metallic sulfides, as by filtration. A water solution of the amino acids is thus obtained. By further manipulation, such as concentration, the amino acids may be isolated in solid form from the solution.

Another method sometimes used to obtain alcohol-insoluble amino acids from their hydrohalides is to treat an alcoholic solution of the amino acid hydrohalide with an amine, such as pyridine or aniline, which is more basic than the amino acid; which yields an alcohol-soluble amine hydrohalide and the alcohol-insoluble amino acid. The latter precipitates from the reaction mixture in a more or less impure state. The method is very difficult and is seldom used, and is applicable only to the preparation of amino acids which are insoluble in alcohol.

A still further method used to obtain amino acids from their salts is to treat the sulfates of the amino acids with the calculated amount of barium hydroxide. This leads to precipitation of barium sulfate, which is removed by filtration. The filtrate contains the free amino acid in solution, from which it can be obtained by further manipulation. Here again the method is difficult, for it involves isolation of the acid from a water solution, and the chance that some barium may be carried along as a contaminant.

The object of our present invention is to liberate amino acids from their acid-addition salts with mineral acids, preferably from their hydrohalides, by a process which is not only very simple and avoids the disadvantages involved in the known methods, but is applicable generally and is effective to obtain the free amino acids in a high degree of purity and in excellent yields.

Our new process consists fundamentally in producing a reaction of the acid-addition salt of an amino acid and a mineral acid, preferably a hydrohalide, with an epoxide, under substantially anhydrous conditions, and in the presence or absence of a non-aqueous solvent or diluent. If a solvent is used, the presence of water in the reaction mixture should be avoided. The 1,2-organic oxides are the preferred reagents; but the 1,3-organic oxides can be used, although they react much more slowly than do the 1,2-organic oxides and are not generally so useful. Among the 1,2-organic oxides which we have used successfully for liberating the amino acids from their hydrohalides are such compounds as ethylene oxide, 1,2-propylene oxide, 1,3-propylene oxide, 1,2-butylene oxide, styrene oxide, and cyclic oxides (such as 1,2-cyclohexene oxide).

The hydrohalide of any amino acid reacts with an epoxide in the following manner:

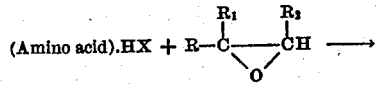

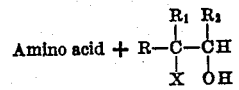

in which R, $R^1$, and $R^2$ are hydrogen atoms or any organic radicals, $R^1$ and $R^2$ may be interconnected to form a ring compound when R is hydrogen or an alkyl radical, and X is a halogen atom.

The reaction is best carried out in the cold or at room temperature; for if such mild conditions are used, then even in the presence of a large excess of epoxide there is no reaction with the amino group of the amino acid, while at high temperatures reaction with such amino group does occur to some extent.

Typical examples of amino acids which are readily recovered from their hydrohalides by our process are the following:

| | |
|---|---|
| Glycine | Tryptophane |
| Alanine | Tyrosine |
| Valine | Diiodotyrosine |
| Leucine | Thyroxine |
| Norleucine | Cystine |
| Isoleucine | Aspartic acid |
| Phenylalanine | Glutamic acid |
| Serine | Hydroxyglutamic acid |
| Threonine | Proline |
| Cysteine | Hydroxyproline |
| Methionine | |

As already indicated, our process works equally well in the presence or absence of a solvent or diluent. Such a solvent or diluent may be used which does not react with the amino acid or with the epoxide under the conditions used in the process. It is at times desirable to use solvents in which the amino acid hydrohalides are soluble but the amino acids are insoluble, or solvents in which the amino acid hydrohalides are insoluble but the amino acids are soluble, as well as solvents in which both are soluble, or diluents in which both are insoluble. Mixtures of solvents or diluents may also be used; for instance, mixtures of alcohols, such as methyl, ethyl, propyl, butyl, or amyl, or mixtures of ethers, ketones, dioxane, halogenated aliphatic hydrocarbons, or cyclic hydrocarbons. In many cases the reaction is desirably catalyzed by the addition (to the reaction mixture) of a small amount of the reaction product of the epoxide with a hydrohalide; for example, ethylenechlorohydrine when ethylene oxide is the oxide used.

The solvent or diluent, and any excess of the epoxide used, can be reclaimed and used again.

The amino acid can easily be obtained in a pure state from the reaction mixture. If the amino acid is only slightly soluble in the reaction mixture, it is only necessary to collect it on a filter and wash it with the solvent until the washings give a negative halogen test. The product thus obtained is ordinarily sufficiently pure, and crystallization in many cases unnecessary.

Mixtures of amino acid hydrohalides lend themselves as readily to this process as do individual amino acid hydrohalides. Furthermore, hydrohalide salts of polypeptides or proteins lend themselves to this process. In some cases, by using mixtures of salts of different amino acids in the presence of a solvent for only one, or for less than all, of the amino acids, a separation of a soluble amino acid or acids from the insoluble amino acid or acids can be obtained in the same process step in which the amino acids are set free; in which case the insoluble amino acids can be at once collected on a filter, and the soluble amino acid or acids can be recovered from the filtrate.

The following are examples of my invention:

*Example 1.*—Fifty grams of dry-p-aminobenzoic acid hydrochloride are suspended in 500 cc. of absolute ethyl alcohol, and 50 cc. (considerable excess) of dry ethylene oxide are added. The mixture is allowed to stand at room temperature until a test sample gives no further test for chloride ion with silver nitrate; five to eight hours standing is usually sufficient. The clear solution contains the free p-aminobenzoic acid, ethylenechlorohydrine, and the excess of ethylene oxide. It can be worked up in either of two ways:

1. It can be diluted with petroluem ether, conveniently about 5 volumes. The p-aminobenzoic acid slowly separates as a solid, and is collected on a filter. For complete precipitation at least twenty hours of standing should be allowed. The melting point of the p-aminobenzoic acid thus obtained is 186–187° C., which shows that it is very pure.

2. The solvent is removed by evaporation at reduced pressure, and the solid which remains is crystallized from water. Yields of 85 to 95 percent, of very pure p-aminobenzoic acid, are readily obtained.

*Example 2.*—Fifty grams of dry p-aminobenzoic acid hydrochloride are suspended in 500 cc. of absolute alcohol, and 125 cc. of 1,2-propylene oxide are added. The mixture is stirred at room temperature until a clear solution results. When the reaction mixture shows a negative test for chloride ion, (as by adding silver nitrate solution), the solution is slowly poured into 1250 cc. of petroleum ether. The mixture is cooled for 24 hours, preferably at about 0° C. The p-aminobenzoic acid separates, and is collected on a filter. The melting point of the p-aminobenzoic acid thus obtained is 186–187° C. The yield is about 95 percent of the calculated amount.

*Example 3.*—One hundred grams of glycine hydrochloride are dissolved in 1750 cc. of absolute alcohol to form a clear solution, and 100 cc. of 1,2-propylene oxide are added to the solution. Almost at once a white crystalline compound begins to separate. This initially produced compound consists of 2 moles of glycine and one mole of hydrogen chloride, and gives a strong test for chloride ion. However, if the mixture is allowed to stand for a longer time, about 12–36 hours, the mixture no longer gives a test for chlorine ion with silver nitrate; which shows that all the hydrochloride has reacted to leave the desired glycine. This is a white crystalline product, and is collected on a filter and washed with absolute alcohol. The decomposition point of material thus obtained is 220–225° C., which is the decomposition point of the glycine used by us.

*Example 4.*—Fifty grams of d,1-alanine hydrochloride are dissolved in 375 cc. of absolute alcohol, to form a clear solution, and 100 cc. of 1,2-propylene oxide are added to it. It is advantageous to stir or shake the mixture from time to time, until a sample of the reaction mixture no longer gives a test for chloride ion when treated with silver nitrate. It usually takes about 12–36 hours for completion of the reaction; during which free alcohol-insoluble d,1-alanine separates. The separated d,1-alanine is collected on a filter, washed with alcohol or some other organic solvent in which the d,1-alanine is insoluble, and dried; and is a white crystalline compound which sublimes above 200° C., an indication that it is very pure. This high purity was confirmed by a nitrogen analysis of the compound.

*Example 5.*—One hundred grams of d,1-alanine hydrochloride are mixed with 250 cc. of 1,2-propylene oxide. After 48 hours the reaction mixture gives no further test for chloride ion with silver nitrate; which indicates that the reaction is complete, i. e., that all the hydrogen chloride has been removed from the d,1-alanine. The d,1-alanine separates; and is collected on a filter, washed with a solvent in which the amino acid is insoluble, and dried. The d,1-alanine thus obtained is analytically very pure, and the recovery from the hydrohalide salt is better than 95 percent.

*Example 6.*—In Examples 2, 3, 4, and 5 it is possible (though less desirable) to use 1,3-propylene oxide instead of 1,2-propylene oxide. But when this is done the reaction is much slower, and a longer standing time is necessary. Here, as in previous examples, the completeness of the reaction is determined by a silver nitrate test on a sample of the reaction mixture.

*Example 7.*—Example 3 is repeated, except that instead of using 1,2-propylene oxide, 1,2-cyclohexene oxide is used.

The foregoing examples illustrate the preferred process of this invention in liberating amino acids from their hydrohalides. Other amino acids may be (and have been) liberated in a similar manner, by treating their hydrohalides with epoxides (preferably 1,2-oxides) in the presence or absence of a mutual solvent. The time required for this process varies with the nature of the solvent and the amino acid hydrohalide used. The completeness of the reaction can, however, be definitely ascertained by the fact that no precipitation of silver chloride then results when silver nitrate is added to a sample of the reaction mixture. In general, the hydrohalides of weakly basic amino acids, such as lysine, react faster with the epoxides than do the hydrohalides of strongly basic amino acids.

Furthermore, hydrohalides of a mixture of amino acids obtained by acid hydrolysis of animal or vegetable proteins (corn gluten) or of casein, when suitably dried and subjected to the action of ethylene oxide or 1,2-propylene oxide, (or less desirably 1,3-propylene oxide), yield a mixture of amino acids in a very pure state, free from halide ions.

The amino acids or mixtures of amino acids thus obtained may be used as protein substitutes, as for intravenous and other feeding; in poultry and livestock feeds; and for various other specific purposes characteristic of the individual amino acids.

Many modifications may be made without departing from the spirit and scope of this invention. We do not limit ourselves to the specific examples thereof, except as outlined in the claims.

We claim as our invention:

1. The process of preparing an amino acid from its salt, which consists in treating an acid-addition salt of an amino acid and a mineral acid with an epoxide under substantially anhydrous conditions, and recovering the amino acid from the reaction mixture.

2. The process of preparing an amino acid from its hydrohalide, which consists in treating an amino acid hydrohalide with an epoxide under substantially anhydrous conditions, and recovering the amino acid from the reaction mixture.

3. The process of preparing an amino acid from its hydrochloride, which consists in treating an amino acid hydrochloride with an epoxide under substantially anhydrous conditions, and recovering the amino acid from the reaction mixture.

4. The process of preparing an amino acid from its salt as set forth in claim 1, in which the epoxide is a 1,2-propylene oxide.

5. The process of preparing an amino acid from its hydrochloride as set forth in claim 3, in which the epoxide is a 1,2-propylene oxide.

6. The process of preparing an amino acid from its salt as set forth in claim 1, in which the epoxide is ethylene oxide.

7. The process of preparing an amino acid from its hydrochloride as set forth in claim 3, in which the epoxide is ethylene oxide.

MORRIS S. KHARASCH.
CHARLES F. FUCHS.